United States Patent [19]

Fead et al.

[11] 3,899,278
[45] Aug. 12, 1975

[54] BLOW MOLDING APPARATUS

[75] Inventors: William A. Fead, Westfield, N.J.; Thomas M. Glynn, Longmeadow, Mass.; Joseph F. Sbarra, Spring Valley, N.Y.; Alfred L. Bower, Lincoln Park, N.J.

[73] Assignee: American Cyanamid Company, Stamford, Conn.

[22] Filed: Dec. 17, 1973

[21] Appl. No.: 425,354

[52] U.S. Cl.. 425/387 B; 425/324 B; 425/DIG. 212
[51] Int. Cl............................................. B29d 23/03
[58] Field of Search ............ 425/387 B, 324 B, 292, 425/302 B, 305 B, DIG. 212, DIG. 204, DIG. 205

[56] References Cited
UNITED STATES PATENTS

| | | |
|---|---|---|
| 3,224,038 | 12/1965 | Budesheim...................... 425/292 X |
| 3,457,592 | 7/1969 | Winchester, Jr. ........... 425/305 B X |
| 3,769,394 | 10/1973 | Latreille...................... 425/305 B X |
| 3,782,877 | 1/1974 | Mehnert...................... 425/302 B X |
| 3,819,317 | 6/1974 | Higginbotham................. 425/287 B |

Primary Examiner—Robert D. Baldwin
Assistant Examiner—Carl A. Rowold
Attorney, Agent, or Firm—Charles J. Fickey

[57] ABSTRACT

An improved apparatus for blow molding hollow plastic containers is provided which comprises a new and novel cutting sleeve which is capable of forming a sealing surface which is substantially smooth and free from imperfections. In addition, an improved method for blow molding hollow plastic containers is also provided, as well as an improved container.

1 Claim, 3 Drawing Figures

PATENTED AUG 12 1975

3,899,278

BLOW MOLDING APPARATUS

Generally stated the subject matter of the present invention relates to an improved blow molding process for preparing plastic containers. More particularly, the invention relates to an improved cutting sleeve for finishing the top annular sealing surface of a blow molded plastic container and to the sealing surface thus formed.

BACKGROUND OF THE INVENTION

In the manufacture of hollow plastic articles by the blow molding process from thermoplastic polymeric materials such as polyethylene, polystyrene, and polyvinyl chloride, a hollow and relatively thick walled tubular form, or parison, is first produced by an extrusion process. The parison is then enclosed in a mold of separable parts, the inside contour of which defines the desired form and design of the final article. While the parison is still in a soft and flowing condition air or another fluid is introduced under pressure through a mandrel or blow pin causing the parison to expand and fill the mold cavity; thus forming the hollow article. The operation includes closure of the bottom end and both the formation of the neck portion of the container and a sealing surface. This is accompanied by the removal of an excess plastic material from the neck portion.

The formation of the neck portion and the removal of the excess plastic with the resulting formation of a sealing surface is usually accomplished through a mandrel or blow pin assembly. The assembly includes a hollow tubular portion through which air under pressure is introduced into the parison enclosed in the neck, the hollow tubular portion having a so-called cutting sleeve, which surrounds its lower end. The cutting sleeve has a cutting edge and a moveable, attached, spring loaded degating sleeve, the lower portion of which has sharp edged serrations for pinchably engaging the inner surface of the top portion of the parison.

In operation the top of the mold is fitted with a striker plate which is contacted on the downward motion of the blow pin by the cutting sleeve. The outer degating sleeve at the same time contacts the inner surface of the top of the parison. This outer degating sleeve is movable in relation to the blow pin and cutting sleeve, as well as being spring loaded to maintain a pressure contact with the excess neck portion of the parison and through sharply cut ridges or serrations firmly engages the excess portion or mohel.

Frequently, a sharp piece of flash remains after removal of the mohel. This usually occurs at the edge of the sealing surface which comes in contact with the container closure and as such tends to interfere with the seal. In many instances, the flash results in cutting the liner of the closure thereby creating potential leakage problems. The flash may also engage the liner so that when the closure is removed the liner remains attached to the container by engagement with the flash.

The present invention represents the culmination of a long series of investigations, conducted largely by the inventors, directed to overcoming the inherent problems of sealing surface imperfections occasioned by conventional blow molding techniques.

Accordingly, it is a primary object of the present invention to provide a means for overcoming the disadvantages resulting from any flash which might remain on the sealing surface of a blow molded container.

Another object of the invention is to provide an improved method for preparing blow molded containers.

It is yet another object of the invention to provide a new and improved blow molded container.

Additional objects and advantages of the invention will be set forth in part in the description which follows, and in part will be obvious from the description, or may be realized by practice of the invention, the objects and advantages being realized and attained by means of the instrumentalities, methods and combinations particularly pointed out in the appended claims.

THE INVENTION

To achieve the foregoing objects and in accordance with its purpose, as embodied and broadly described, the present invention relates to an improved apparatus for blow molding a hollow plastic container including separable mold members for enclosing a plastic tube or parison into which air is blown through a hollow mandrel or blow pin inserted into the tube to cause the tube to conform to the inner configuration of the mold, the combination of a striker plate in annular form surrounding the neck portion of the container at the top of the mold with a portion of the parison extending, a hollow blowing mandrel having a cutting sleeve surrounding the lower end of the mandrel, a blow pin sleeve with a serrated surface adjacent to the lower edge and being manually attached to the blowing mandrel, and with means for causing rotation of the blow pin sleeve, the cutting edge of the cutting sleeve contacting the striker plate and the serrated surface of the blow pin sleeve contacting the extended portion of the parison, or mohel, with spring loaded pressure relationship, the blow pin sleeve after blowing of the container being rotated to sever the mohel from the neck of the container, the improvement which comprises said cutting sleeve having a flat annular platform, or land area, extended from the cutting edge before the start of the sealing surface forming edge which extends from above the lower surface, thereby imparting a raised sealing surface to the top of the container above the ridge from which the mohel is severed.

The present invention further provides a method for trimming the top of a blown plastic container, as well as a new and improved blown plastic container.

It is to be understood that both the foregoing general description and the following detailed description are exemplary and explanatory and are not restrictive of the invention.

The particular improvement in the fabrication of the container top involves a cutting sleeve with an annular land area around the bottom of the cylindrical surface, this design of the cutting sleeve resulting in a small offset in the top sealing surface of the container so that if any slight flash remains on the top after removal of the excess or mohel the slight flash remaining will occur on the rim below the sealing surface.

An additional advantage of the present invention is that the newly designed cutting sleeve may be used for longer periods of time without resharpening. The conventional cutting sleeves tend to dull quickly, resulting in excessive flash. For example, the cutting sleeve must frequently be renewed every 24 hours. The cutting sleeve of the present invention can be used for longer periods of time without resharpening, since while the cutting sleeve becomes dull from use, the resulting flash is below the sealing surface of the container and does not interfere with sealing.

For a fuller understanding of the nature of the invention, reference should be had to the following detailed description taken in connection with the accompanying drawing in which.

DETAILED DESCRIPTION OF THE INVENTION

Figure 1:
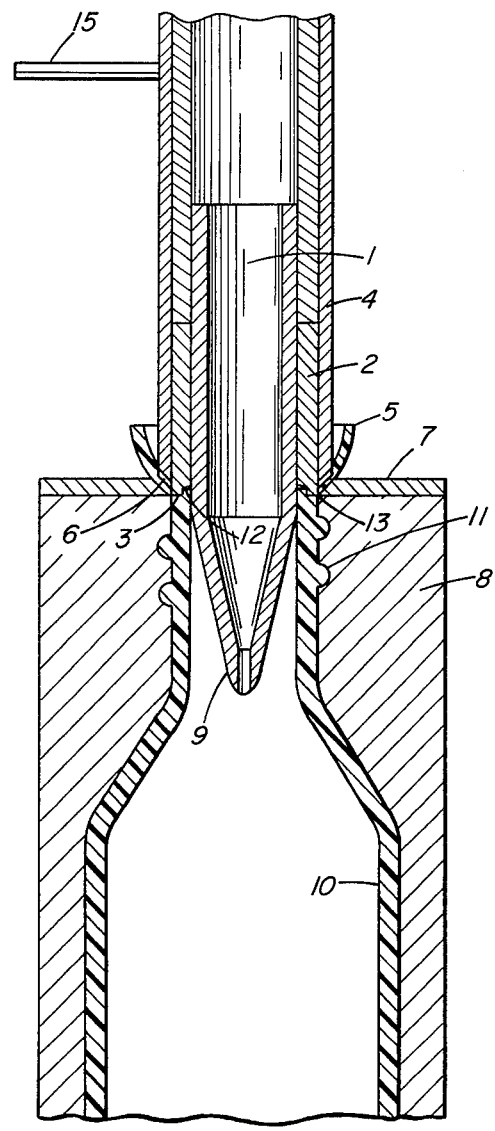
FIG. 1 is a side elevational, sectional view of a blow pin assembly along with a mold, container and striker plate.

According to one embodiment of the invention, a blow pin assembly may be seen in FIG. 1, which shows a blow pin 1, which is a hollow cylinder, the lower end of which is surrounded by a cutting sleeve 2, with a land area 3. The outer blow pin sleeve 4, or degating sleeve, is removably positioned around the blow pin and is spring loaded for downward motion to contact the upper excess portion of the plastic container 5, or mohel, with engagement of the plastic through serrated edges 6. The lower edge of the cutting sleeve on downward motion contacts the plastic and the striker plate 7. When the parison, or tubular container blank, is encompassed by mold 8 and the blow pin assembly is inserted, air is blown through the blow pin nozzle 9, forming a container 10 along with threads 11 for engagement with a threaded closure. As a result of the cutting sleeve contacting the plastic at the striker plate, a sealing edge, or surface, is formed 12 and the mohel is severed from the container by the cutting sleeve at a point 13 which is below, concentric with and outside of the sealing surface. The mohel is then removed by a rotational motion imparted to the outer blow pin sleeve through mechanical means 15.

Figure 2:
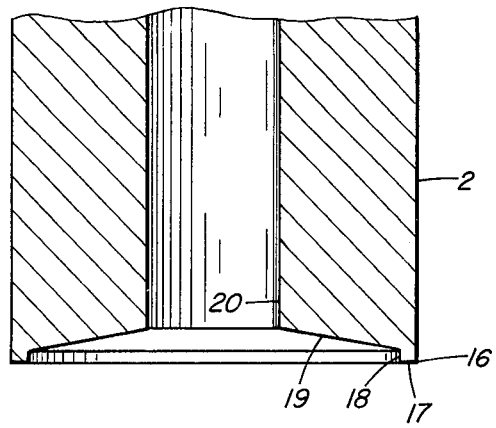
FIG. 2 is a side elevational, sectional view of the lower portion of the cutting sleeve.

Now with reference to FIG. 2, which shows a side elevational, sectional view of the cutting sleeve, the outer perimeter of which constitutes the cutting edge 16. At a right angle to the cutting edge is a straight land area 17, or a flat annular surface, with a further offset 18, which is upward and parallel to the sides of the cutting sleeve. From the upper terminus of the inner offset the base 19 of the cutting sleeve rises at an angle of about 10° terminating at the inner wall 20 of the cutting sleeve which serves to accommodate the blow pin.

Figure 3:
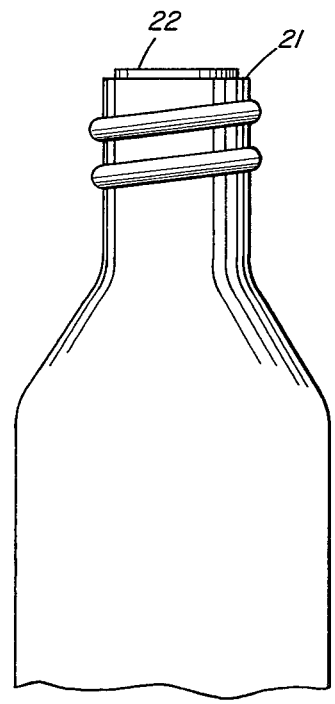
FIG. 3 is a side elevational view of a molded, plastic container.

FIG. 3 which shows a side elevational view of a molded plastic container, indicates an offset edge 21, which is below, concentric with and outside of the sealing surface 22.

To illustrate the sequence in somewhat more detail of the operation, the steps involved may be listed as follows:

1. After the tubular blank or parison is formed by an extrusion process using a polymeric plastic material such as polyvinyl chloride, the parison is moved into position for further operation.

2. Two halves of the mold are moved upward and positioned to enclose the parison.

3. The bottom of the parison is then sealed.

4. The mold moves in the machine to the blow station with the parison enclosed.

5. The blow pin assembly moves down through the top opening of the parison and with the same motion the cutting sleeve contacts the striker plate and the outer blow pin sleeve or degating sleeve contacts the excess top extended top portion of the parison or mohel, the serration of the degating sleeve engaging the mohel.

6. Air under pressure is passed through the blow pin nozzle expanding the parison to fill the mold and form the bottle and the air is then exhausted.

7. The outer blow pin or degating sleeve is then turned slightly giving a twist action to the mohel which separates it from the top where the cutting sleeve had contacted the striker plate.

8. The two parts of the mold are opened, the bottle still being in contact with the nozzle.

9. The blow pin assembly with the separated mohel and the bottle is then passed up through a stripper ring (not shown) which removes the bottle and the cut mohel from the end of the blow pin assembly.

In a practical application, the cutting sleeve is designed so that the land area can be about 0.020 inch wide; the width must be of a measurement which will impart sufficient strength to the outer edge of the cylindrical sleeve and the cutting surface. Thus, it may be seen that without any expensive redesigning of the blow molding machines and with a very simple but remarkable redesign of the cutting sleeve a separate bottle top results avoiding the difficulties encountered previously where flash occurred at the sealing surface of the bottle which contacts the liner of the enclosure.

We claim:

1. An improved apparatus for blow molding a hollow plastic container including separable mold members for enclosing a parison into which air is blown causing the tube to conform to the inner configuration of the mold, the combination of a striker plate in annular form surrounding the neck portion of the container at the top of the mold with a portion of the parison extending, a hollow blowing mandrel having a cutting sleeve surrounding the lower end of the mandrel, a blow pin sleeve with a serrated surface adjacent to the lower edge and being manually attached at the blow mandrel, and with means for causing rotation of the blow pin sleeve, the cutting edge of the cutting sleeve contacting the striker plate and the serrated surface of the blow pin sleeve contacting the extended portion of the parison with spring load pressure relationship, the blow pin sleeve of the container adapted to be rotated to sever the extended portion of the parison from the neck of the container after blowing, the improvement which comprises said cutting sleeve having a flat annular platform extending from the cutting edge before the start of a sealing surface forming edge which extends from above the lower surface, thereby imparting a raised sealing surface to the top of the container above the edge from which the extended portion of the parison has been severed, said edge being below, concentric with and outside of the sealing surface.

* * * * *